United States Patent
Davies et al.

(10) Patent No.: US 6,230,210 B1
(45) Date of Patent: May 8, 2001

(54) METHOD AND APPARATUS FOR RE-SYNCHRONIZING A NETWORK MANAGER TO ITS NETWORK AGENTS

(75) Inventors: Graham John Davies, Tetbury; P. Nigel Pennington, Chippenham; Roy Startup, Malmesbury, all of (GB)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/140,273

(22) Filed: Aug. 26, 1998

(51) Int. Cl.⁷ .............................. G06F 15/16; G06F 11/00
(52) U.S. Cl. ........................ 709/248; 709/202; 714/707
(58) Field of Search .................................. 709/248, 202; 714/707, 775, 12

(56) References Cited

U.S. PATENT DOCUMENTS

| | | | |
|---|---|---|---|
| 5,469,503 | * 11/1995 | Butensky et al. ............ | 379/265 |
| 5,740,368 | * 4/1998 | Villalpando ................. | 709/202 |
| 5,832,218 | * 11/1998 | Gibbs et al. ................. | 709/203 |
| 6,031,978 | * 2/2000 | Cotner et al. ............... | 709/248 |
| 6,065,039 | * 5/2000 | Paciorek ..................... | 709/202 |

FOREIGN PATENT DOCUMENTS 0 621 706 A2   10/1994  (EP) .
0 751 650 A2    1/1997  (EP) .

* cited by examiner

*Primary Examiner*—Krisna Lim
(74) *Attorney, Agent, or Firm*—Synnestvedt & Lechner LLP (57) ABSTRACT

A method and apparatus for resynchronizing a network manager to its agents. Each object instance of an agent in an object-oriented management scheme is assigned two special attributes, namely, DATASYNCH and UNIQUEID. UNIQUEID is a unique number assigned to each object instance. DATASYNCH essentially is a counter which is incremented each time a change occurs to an object instance. When resynchronization is necessary, the manager requests the UNIQUEID and DATASYNCH attributes from its agents and compares those values with the corresponding values stored in its database. With respect to any object instance which does not match in both its UNIQUEID and DATASYNCH attributes to the manager's database, the manager uploads those object instances from the agent's database and/or revises its database accordingly.

26 Claims, 4 Drawing Sheets

METHOD AND APPARATUS FOR RE-SYNCHRONIZING A NETWORK MANAGER TO ITS NETWORK AGENTS

FIELD OF THE INVENTION

The invention pertains to network communication systems. More particularly, the invention pertains to a method and apparatus for re-synchronizing a network manager to its agents.

BACKGROUND OF THE INVENTION

Communications networks with a significant number of communication nodes typically employ a manager/agent scheme to control communications between the network communication nodes. In such schemes, the communication nodes are termed "agents", while the nodes which manage communications on the network are termed "managers".

Figure 1:
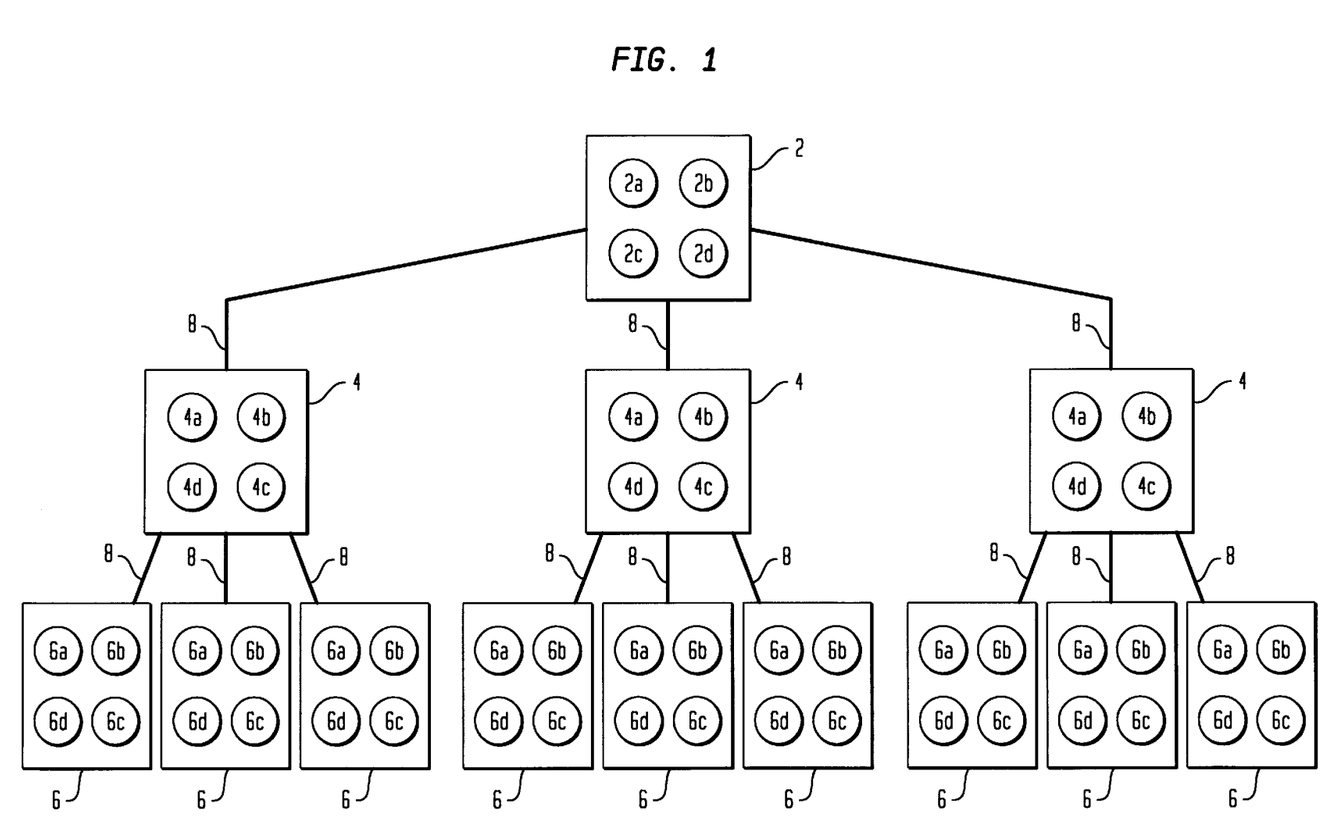
FIG. 1 is a block diagram of an exemplary communications network.

FIG. 1 illustrates one common type of communications network 10 and control scheme therefor, including a plurality of managers 4 which each manage a plurality of agents 6. The plurality of managers 4 may be connected to each other in any one of a number of configurations, including tree (as shown) and star configurations. The various managers 4 may communicate with each other through a higher level node, termed a network manager 2 N (as illustrated), which communicates with all of the managers and the overall network. In other schemes, the managers 4 may communicate directly with each other (not shown). Each node 2, 4, 6 on the network typically will include some type of data processing unit, 2a, 4a, and 6a and memory. As an exemplary illustration in FIG. 1, each node 2, 4, 6 has both ROM 2b, 4b and 6b as well as RAM 2c, 4c and 6c. Each node also should include a separate database memory, 2d, 4d, and 6d, for at least network operational data.

In an object-oriented management scheme, each agent 6 maintains a Management Information dataBase (MIB) in database memories 6d that contains the condition of all of the attributes (commonly termed object instances) of all of the objects of that agent. The managers 4 usually also maintain in database memories 4d a putative copy of the MIB of each agent under its management control. The copy stored at the manager is deemed putative since it may not be identical to the data stored at the agent. The agent's MIB data is assumed to be the most correct copy of the MIB.

As long as the copy of the MIB for an agent stored at the manager is identical to the MIB stored by the agent, the manager and the agent are synchronized. However, various events can occur which would cause the manager to either lose synchronization with one or more of its agents or, at least, not know whether it is synchronized to one or more of its agents. For instance, the manager may simply become disabled for a period of time during which object instances of its agents may be changed, added or deleted. Also, it is possible for a communication link (or association) between a manager and an agent to go down for a period of time. In either event, the manager, when it re-establishes an association with the agent, will not know if its putative copy of the agent's object instances is current, and will need to confirm and/or update its database in accordance with any changes that occurred during the period of non-communication with the agent.

In one prior art resynchronization scheme, each agent maintains an event log in which each and every creation, deletion or change in state of an object instance is recorded. Whenever an event occurs, it is stored in the event log. Also, an M event report is sent from the agent to the manager informing it of the event. There usually is no confirmation of M event reports by the manager. The manager will update its relevant copy of the object instances for the agent accordingly. However, if the communication association between the manager and the agent is down, the manager will not receive the Event Report and, therefore, will no longer be synchronized with the agent.

The object instances in the event log are tagged with, for instance, a time-stamp. The event log is maintained in a circular buffer. After communication between a manager and an agent is re-established, the manager can check the event log and read out every entry in the event log having a tag indicating that the event occurred after the time that the association was lost. This type of resynchronization scheme can be extremely time consuming if the number of events which occurred during the loss of association is significant. In fact, the loss of an association between a manager and an agent is frequently caused by, or at least associated with, a problem in the system that will lead to a significant number of other network events, including changes in the object instances of the agents. Accordingly, a significant number of changes in object instances of the agents frequently occurs precisely when a communication association is lost between a manager and an agent. As an example, the MIB in present network systems typically may have between 500 and 10,000 object instances per agent. Smaller object instances may have on the order of 200 to 400 bytes each. However, larger ones can have 5,000 to 8,000 bytes of information. Future network systems are projected to have substantially increased numbers and sizes of object instances. Accordingly, resynchronization can be rather time consuming.

If the number of events occurring during a loss of association between a manager and an agent exceeds the length of the log, the log can no longer be used for resynchronization, since the earliest events are lost. In such a case, resynchronization can be achieved only by reading the entire MIB database out of the agent into the manager.

Accordingly, it is an object of the present invention to provide an improved resynchronization scheme for a network.

It is another object of the present invention to provide a resynchronization scheme for a network in which the amount of data which must be exchanged to achieve resynchronization is substantially reduced.

SUMMARY OF THE INVENTION

In the present invention, each object instance stored in the MIB of an agent contains two additional attributes, termed "UNIQUEID" and "DATASYNCH". UNIQUEID is a unique number assigned to each object instance when it is created. Preferably, the UNIQUEID attribute is of sufficient bit length to assure that, in any practical situation, there are more unique ID's available than possible object instances for the agent.

DATASYNCH is a number assigned to each object instance upon creation. Typically, the number assigned upon creation will be 0 or 1. Each time that object instance is updated, DATASYNCH is incremented by 1. As with UNIQUEID, the bit length of the DATASYNCH attribute preferably is enough to handle any practical number of changes that might occur to an object instance during a loss of association.

When resynchronization is necessary, the manager will poll the agent requesting a copy of the UNIQUEID and DATASYNCH attributes for each object instance in the agent's MIB. While the agent is generating this report and communicating it to the manager, the manager is likewise preparing a similar report of each UNIQUEID and DATA-SYNCH attribute stored in its database.

The manager then compares the UNIQUEID and DATA-SYNCH attribute values received from the agent to its putative copy of the UNIQUEID and DATASYNCH values for the object instance for that agent.

For each UNIQUEID which the manager has in its database that does not have a corresponding UNIQUEID at the agent, the manager will delete that object instance from its database. For each object instance detected at the agent for which the manager does not have a corresponding UNIQUEID or that has a DATASYNCH attribute value different from the DATASYNCH attribute value stored at the manager, the manager reads the entire object instance from the agent and updates its corresponding object instance accordingly, including updating the UNIQUEID and DATA-SYNCH values. No action is taken with respect to object instances for which both the UNIQUEID and DATASYNCH attributes match.

The manager is resynchronized to the fault status of the agent by requesting each active fault status from the agent and updating its database accordingly.

DETAILED DESCRIPTION OF A PREFERRED EMBODIMENT OF THE INVENTION

The description herein of exemplary embodiments of the invention specifically pertains to networks in accordance with the ITU-T international standards, which are incorporated herein by reference, and assumes a familiarity with those standards, particularly sections x217 and x.700 et seq. It should be understood, however, that the invention is not limited to networks in accordance with the aforementioned standard or to the specific embodiments described herein, which are merely exemplary and not limiting. As mentioned above, there are many circumstances in which the communication link (or association) between a manager 4 and an agent 6 is lost; justifying a resynchronization operation. For instance, resynchronization may be necessary after any break in the communication link between the manager 4 and its agent 6, such as may be caused by a break or failure in either the manager 6, the agent or the communication medium 8 therebetween. Also, resynchronization may be necessary after a lengthy upload, during which time changes may have occurred at the agent which could not be communicated to the manager due to the use of the communication channels for the upload.

Also, a system user may manually request a resynchronization operation and/or the agent may automatically request resynchronization under various circumstances.

As noted above, the present invention is adapted for use in an object-oriented management scheme. In an object-oriented method, each agent is described as a collection of objects inside a container. The agent (or network element) stores in its memory 6c its condition (i.e., the information needed by itself and other network elements for it to operate and communicate on the network) in a series of stored object instances. For example, if a particular agent is a personal computer (PC) connected to the network, exemplary object instances might be the identity and configuration of each card or peripheral device installed on the PC. An object instance may have further object instances of its own. For example, if the exemplary PC (which is an object instance itself) has a CD-ROM player, one object instance contained by the PC object instance would be the CD-ROM object instance. The information contained therein would disclose the configuration and attributes of the CD-ROM player, such as its speed and its drive letter. The agent stores this information in a MIB (Management Information Base) database in database memory 6d. In order to properly manage its agents 6, a manager 4 maintains a putative copy of the MIB database in database memory 4d.

Changes to an object instance can occur in one of two ways. The manager 4 may cause a change to an object instance by sending an M Set instruction, which basically informs the agent 6 to set a certain object instance to a particular condition. Alternately, the manager 4 can send an M Action instruction to an agent 6 instructing the agent to perform some function. That function might cause the agent 6 to change an object instance. In either event, each time an object instance is created, deleted or altered, the agent 6 updates its MIB database accordingly and also sends an M Event Report to its manager 4 notifying it of the change. The manager 4 then updates its copy of the MIB database for that particular agent accordingly. In any circumstance in which M Event Reports issued by an agent 6 are not received by the manager 4, resynchronization should be performed. For instance, while communication between a manager and its agent is down, it is possible that a peer manager on the network may assume control of the agent during this down time. In fact, our application Ser. No. 09/140,272, entitled GEOGRAPHIC REDUNDANCY PROTECTION METHOD AND APPARATUS FOR A COMMUNICATIONS NETWORK and filed on even date herewith, describes a scheme under which this may occur, incorporated herein by reference. When the original manager re-establishes association with the agent, it will need to resynchronize with it.

In accordance with the present invention, each object instance stored in the MIB of an agent 6 is assigned two additional attributes, termed "UNIQUEID" AND "DATA-SYNCH". UNIQUEID is a unique number assigned to each object instance when it is created. Preferably, the UNIQUEID attribute is of sufficient bit length to assure that, in any practical situation, there are more unique ID's available than possible object instances for the agent. In the presently preferred embodiment, UNIQUEID is 15 bits in length and, therefore, can accommodate over 32,000 object instances per agent. As an added precaution against two object instances being assigned the same UNIQUEID, if more than 32,000 object instances are created in an agentdomain, the software at the agent will look for holes in the UNIQUEIDs (object instances that were created and then deleted) and fill in those holes in order to continue to assure that UNIQUEID remains unique for each existing object instance in the MIB database.

UNIQUEID is a GETonly attribute. In particular, this means that it is an attribute that cannot be changed by the manager. It can only be retrieved by the manager. This further assures uniqueness.

DATASYNCH is a number assigned to each object instance upon creation. Typically, the number assigned upon creation will be 0 or 1. Each time that object instance is updated, DATASYNCH is incremented by one. As with UNIQUEID, the bit length of the DATASYNCH attribute preferably is sufficient to handle any practical number of changes that might occur to an object instance during a down time. In a preferred embodiment, DATASYNCH also is 15 bits long.

The following discussion pertains to one manager resynchronizing with one agent. However, it should be understood that, in the preferred embodiment, all managers 4 have the discussed capabilities and that each manager 4 can perform resynchronization with any one or more of its agents 6.

When resynchronization is necessary, the manager 4 will poll the agent 6 requesting a copy of the UNIQUEID and DATASYNCH attribute for each object instance in the agent's MIB database 6d. While the agent is generating this report and communicating it to the manager, the manager is likewise preparing a similar report of each UNIQUEID and DATASYNCH attribute stored in its database 4d.

After both reports have been generated and the agent 6 has sent its report to the manager 4, the manager 4 compares its report with the report received from the agent 6.

For each UNIQUEID that the manager 4 has in its database that does not have a corresponding UNIQUEID at the agent 6, the manager 4 will delete that object instance from its database. For each object instance detected at the agent 6 for which the manager 4 does not have a corresponding UNIQUEID, the manager 4 will read the entire object instance from the agent 6 and update its corresponding object instance accordingly, including updating the UNIQUEID and DATASYNCH values. For each object instances for which the manager 4 and agent 6 having a matching UNIQUE ID value, but non-matching DATASYNCH values, the manager 4 will read the entire object instance from the agent 6 and update its corresponding object instance accordingly, including updating the UNIQUEID and DATASYNCH values.

For each object instance for which both the UNIQUEID and DATASYNCH attributes match, no action is taken.

If the number of times that an object instance at an agent has been revised during a loss of association with its manager is exactly equal to the maximum possible value of the DATASYNCH attribute (i.e., $2^{15}$=32,768 in the described embodiment in which DATASYNCH is 15 bits in length), then the DATASYNCH attribute stored by the manager will match with the DATASYNCH value stored by the agent, even though the corresponding object instance actually has been revised at the agent. Schemes may be used in order to detect such a problem. However, since the likelihood of exactly 32,768 revisions occurring during a loss of association between an agent and its manager are diminishing small, in the preferred embodiment of the invention, no protection is provided for this almost non-existent error source.

FIGS. 1–5 illustrates a preferred implementation of the present invention. In one embodiment of the invention, each agent has three attributes that are relevant to the present invention, namely, management state, MIBstate and MIBlock. The management state attribute has several possible states of which only a few are relevant to the present invention. The management state basically conveys the state of the agent in terms of the general operation which is currently being undertaken. For instance, when the agent is operating in its normal operating condition and is available for communication, the management state is NORMAL. The management state also could be RESYNCHING, indicating that a resynchronization operation of object instances in accordance with the present invention is currently being performed, or REEVALUATINGFAULTSTATUS, indicating that the agent is updating its manager to the current active fault conditions of the agent. Other possible exemplary management states that the possible include UPLOADING and DOWNLOADING. The management state generally informs the other nodes on the network that might attempt to communicate with the agent of its present state.

The MIBlock attribute may have two conditions, namely, LOCKED and UNLOCKED. LOCKED means that the MIB database is presently inaccessible and that no changes may be made thereto at this time. UNLOCKED means that the MIB database can be updated.

The MIBstate denotes the agent's view of the state of its MIB database. MIBfilled indicates that the MIB database is full and can be resynchronized with the manager. MIBempty indicates that the agent's MIB database is empty. MIBempty means that the manager and agent cannot resynchronize to each other using the method and apparatus of the present invention. Rather, the manager must download its putative copy of the MIB database for that agent to the agent.

Figure 2:
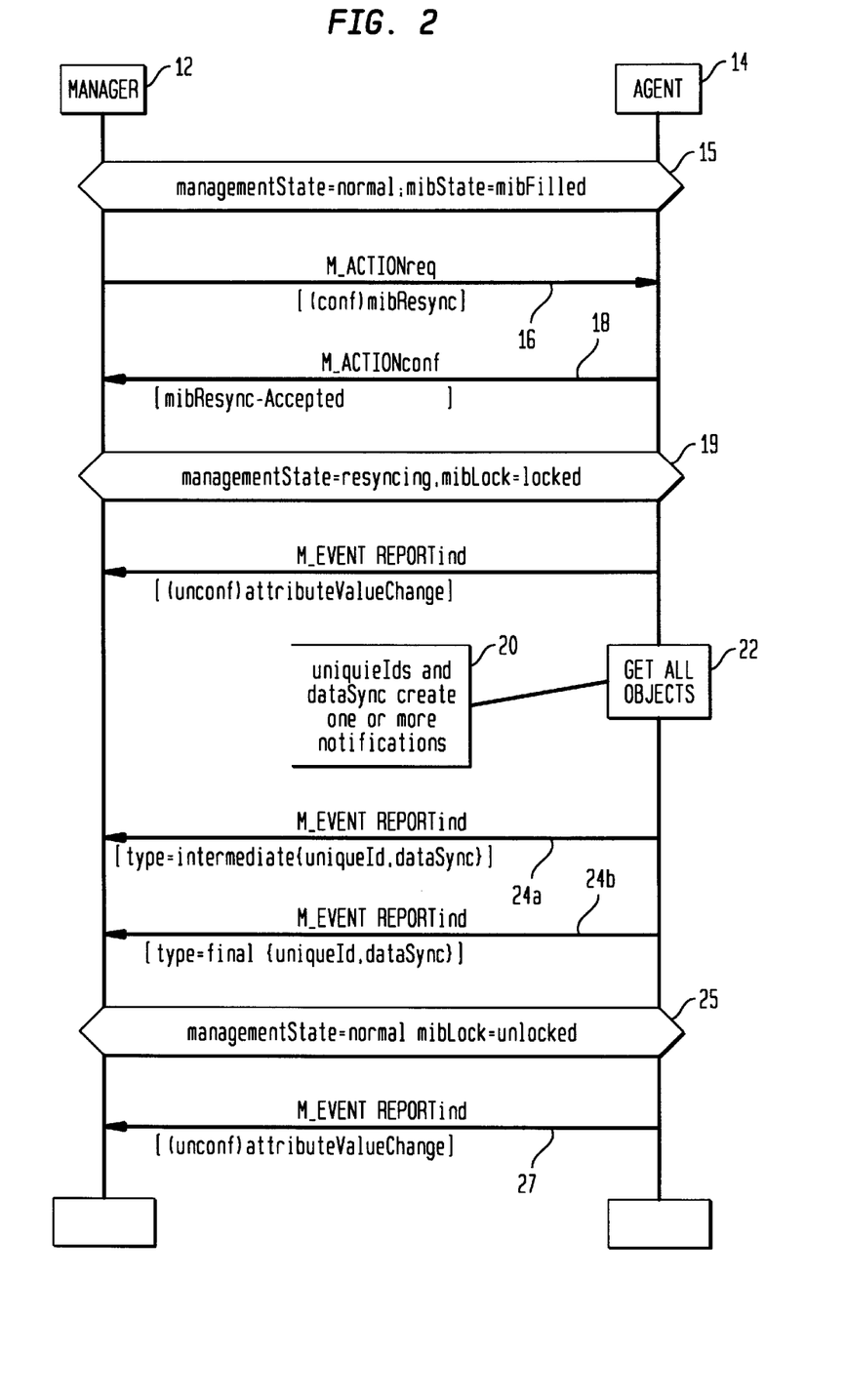
FIG. 2 is a message flow diagram of the resynchronization interaction.

FIG. 2 is a message flow diagram generally illustrating the overall resynchronization process. Under normal conditions, the management state and MIBstate of the agent are NORMAL and MIBFILLED, respectively, as shown at 15. In the first step 16, the manager 12 sends a MIBRESYNC (confirmed) M-Action to agentdomain in the agent. Assuming that the agentdomain's managementstate is NORMAL and its MIBstate is MIBFILLED, it sends a confirmation 14 back to the manager. If either of these conditions is not met, it rejects the MIBRESYNC M-ACTION (not shown).

Assuming that agentdomain responds with MIBRESYNC confirmation 18, the agent also changes its managementstate to RESYNCHING and its MIBstate to LOCKED, as shown at 19. A managementstate of RESYNCHING informs any other object attempting to communicate with the agent that it is resynching. The LOCKED condition of MIBlock will present the MIBstate from changing during resynchronization.

Next, the agent sends an M event report 20 to the manager indicating that it has changed its managementstate and MIBstate as indicated. Then, the agent compiles the UNIQUEID and DATASYNCH data for transmission to the manager, as indicated at 22. The Agentdomain object instance then sends the UNIQUEID and DATASYNCH values to the manager by sending one or more MIBSYNCHDATA notification packets 24. MIBSYNCHDATA packets 24 may be M-EVENT-REPORTS in accordance with ITU-T standard sections x.710 et seq. Each packet also contains information as to whether it is an intermediate packet 24a or the last packet 24b. After the final packet 24b, the agent 14 sets its managementstate and MIBstate attributes back to NORMAL and UNLOCKED, respectively, as shown at 25 and sends an M Event Report 27 to the manager 12 informing it of the changes.

As disclosed more fully below in connection with FIGS. 3–4, the manager then compares the UNIQUEID and DATASYNCH information received from the agent with its own UNIQUEID and DATASYNCH information.

For existing object instances with matching UNIQUEIDs and DATASYNCH values, no action is performed (no figures provided).

For object instances that exist in the manager's MIBstate database, but for which no corresponding MIBsynchdata notification is received, the manager deletes its image of the object instance (no figure provided).

Figure 3:
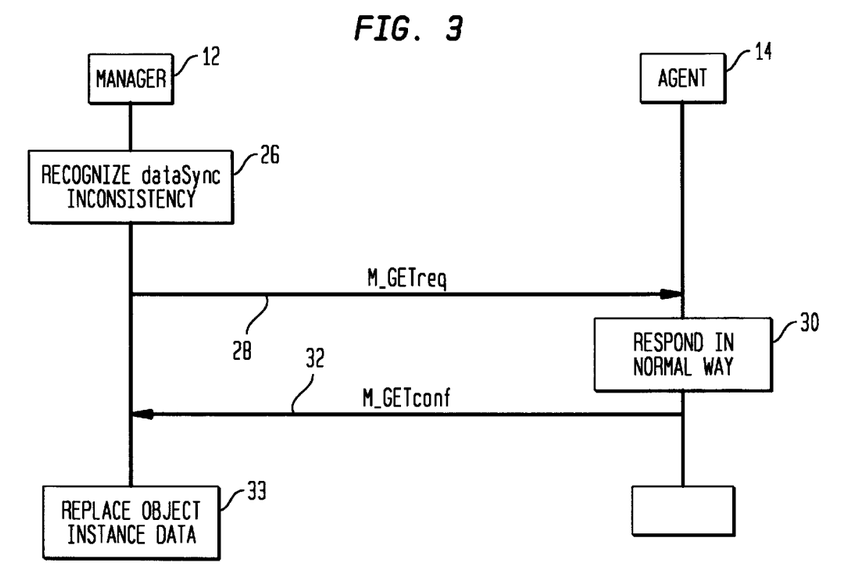
FIG. 3 is a message flow diagram of the manager resynchronization scheme with respect to an existing object instance.

FIG. 3 is a message flow diagram illustrating operation when the manager detects an existing object instance with a non-matching DATASYNCH value, as shown at 26 in FIG. 3. The manager 12 first sends an M-GET request 28 for all attributes of that object instance. The agent 14 responds to the request by generating the requested data for transmission, as shown at 30. When ready, the agent 14 responds to the manager 12 with an M-GET confirmation 32 transmitting the requested data. The manager then replaces the object instance data in its database with the new information, as shown at 33. The operation is repeated for each such object instance for which the corresponding DATASYNCH values do not match.

Figure 4:
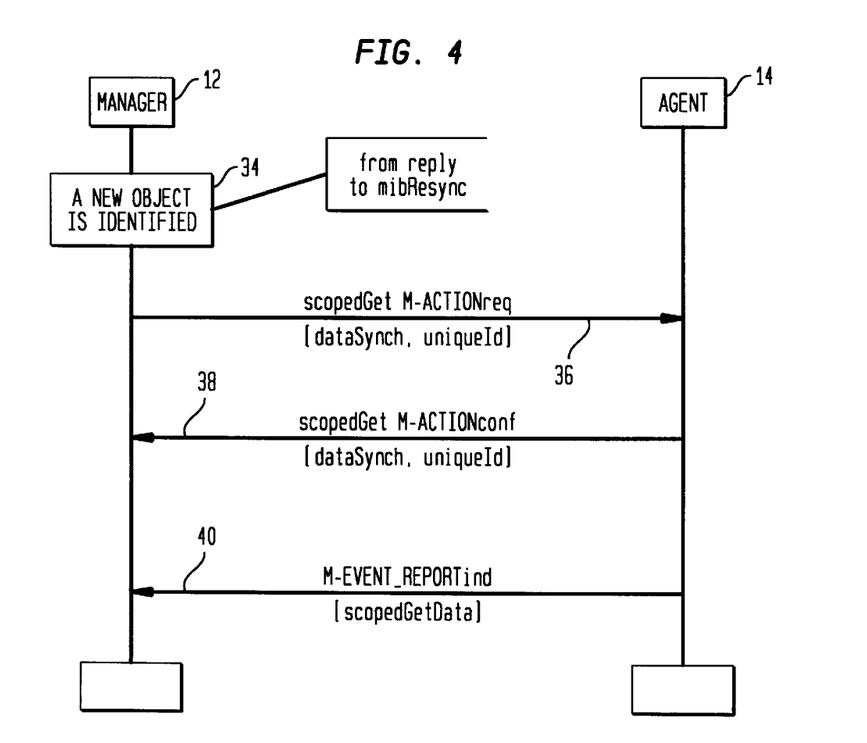
FIG. 4 is a message flow diagram of the manager resynchronization scheme with respect to an object instance that was created during a loss of association between the agent and the manager.

FIG. 4 illustrates operation for object instances that are received in a MIBsynchdata notification from the agent, but for which there is no corresponding object instance in the manager's MIBstate database i.e., for which there is no matching UNIQUIED. Specifically, the manager 12 determines that the agent has sent a UNIQUEID for which it does not have a corresponding UNIQUEID, as shown at 34. It then sends a SCOPEDGet M-ACTION 36 for the corresponding object instance. The agent responds with a confirmation 38 followed by the requested data, which is sent in an M Event Report 40. The SCOPEDGet action filters for the given UNIQUEID to obtain the full details of the object instance.

If the association between the manager and the agent is dropped during the resynchronization operation, the agent will return its managementstate to NORMAL. The resynchronization can then be performed again when the association is re-established with no adverse affects to the resynchronization operation.

When a manager must resynch with more than one of its agents, the resynchronization process will be performed sequentially for all of the agents, with the order based on the value of the agentdomain, starting at agentdomainID=1. In the event of an association failure when performing a resynchronization on multiple agents, the manager will re-do the entire process of resynchronization with all agents starting with agentdomainID=1 again.

For all node types, if the resynchronization process fails, the current association will be aborted and the manager will attempt reassociation.

Figure 5:
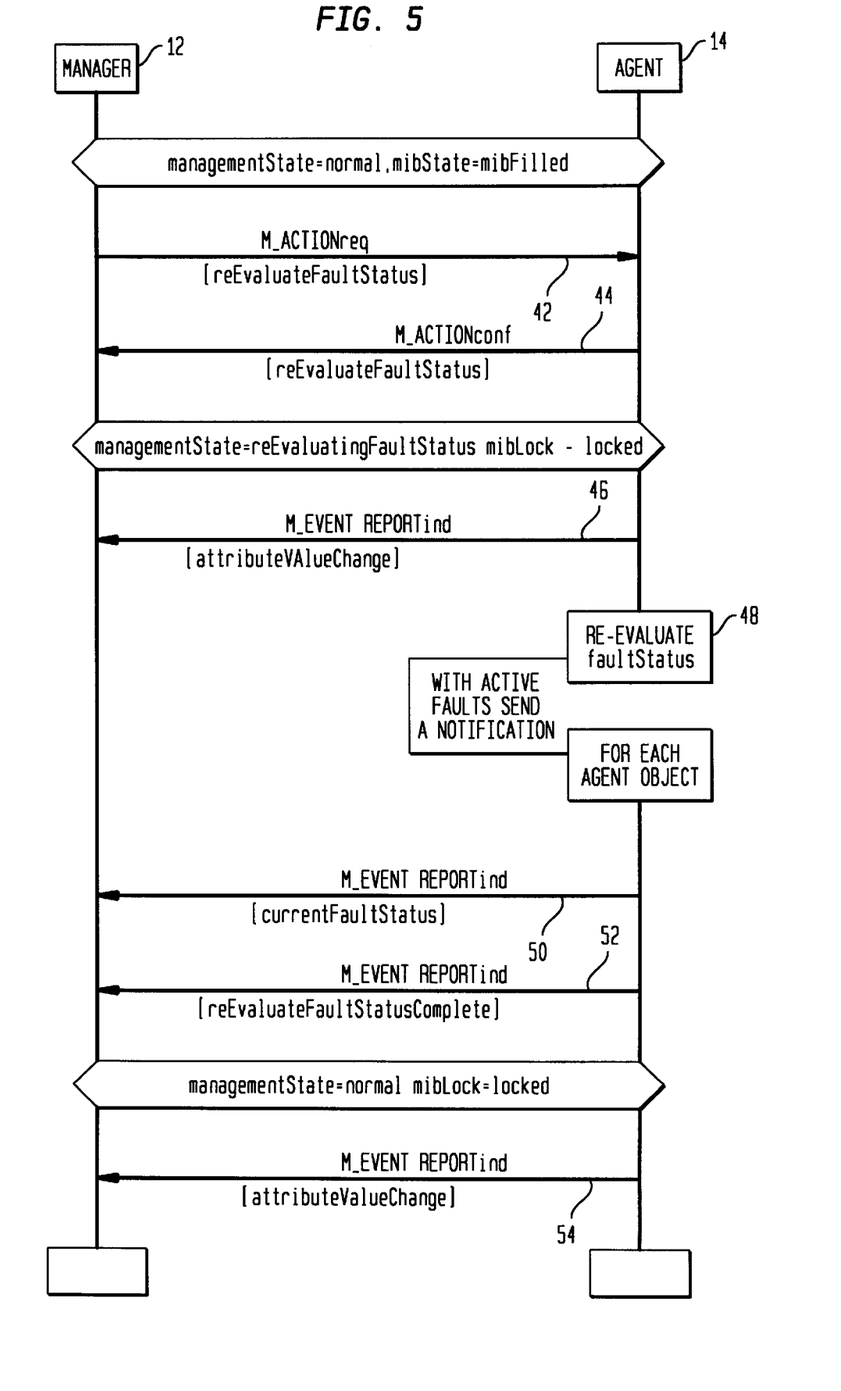
FIG. 5 is a message flow diagram illustrating resynchronization of fault status.

In a preferred embodiment of the invention, whenever resynchronization occurs, the manager also resynchronizes with respect to faults which may have occurred during the loss of association. Referring to FIG. 5, the manager will request a faultstatus resynchronization by sending a REEVALUATEFAULTSTATUS M-ACTION 42 to event-control in the agent. The request is confirmed by the agent 44. The agent will then change its managementstate of the affected agentdomain to REEVALUATINGFAULTSTATUS and change its MIBstate to LOCKED. It will then notify the manager of this action with an M Event Report 46.

Next, the agent collects and compiles the requested information, as shown at 48. Each object instance in the agent that has one or more active faults sends a CURRENTFAULTSTATUS notification 50 for each active fault. After all the CURRENTFAULTSTATUS notifications 50 have been sent, the agent sends a RE-EVALUATEFAULTSTATUS-COMPLETE notification 52 for that agentdomain to indicate the end of the operation.

CURRENTFAULTSTATUS notification 50 and RE-EVALUATEFAULTSTATUS-COMPLETE notification 52 may be M_EVENT REPORTs under the ITU-T standard (see sections x.710 and x.711). The agent will then set its management state back to NORMAL and MIBstate back to UNLOCKED (of the affected agentdomain) and notify the manager of these actions with an M Event Report 54.

In the most typical situations where resynchronization is required, resynchronization by the method and apparatus of the present invention requires the transmission of orders of magnitude less data than in the prior art system in which the event log of the agent is read out by the manager. In a worst case scenario, it is projected that the method and operation of the present invention may transmit approximately the same amount of data as the prior art event log method. However, in a more typical situation, the amount of data transferred to perform a resynchronization will be orders of magnitude less than in the prior art event log type scheme.

With respect to the updating of the fault status of an agent, the method and apparatus disclosing the invention will show improved reduction in data transfer relative to the prior art fault event log method as the duration of the loss of association increases.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit of scope of the invention. The foregoing description is by way of example only, and not limiting. The invention is limited only as defined in the following claims and equivalents thereto.

What is claimed is:

1. A method of resynchronizing a network manager to a network agent in a data communication network in which managers maintain a putative copy of data describing said agent, said method comprising the steps of:

(1) storing at said agent, for each individual unit of data describing said agent, a first value corresponding to each unit of data, said first value being unique for every said unit of data;

(2) storing at said agent, for each of said units of data, a second value that indicates the number of times that the corresponding unit of data has been changed;

(3) storing at said manager a putative copy of said first and second values;

(4) comparing said first and second values stored at said agent with said corresponding first and second values, respectively, stored at said manager; and (5) for every unit of data for which said first and second values stored at the manager do not match the first and second values, respectively, stored at the agent, revising the unit of data stored at the manager.

2. A method as set forth in claim 1 wherein step (5) includes revising said first and second values stored by said manager to match the corresponding first and second values stored by said agent.

3. A method as set forth in claim 1 wherein step (5) comprises the steps of;

(5.1) replacing the corresponding unit of data stored at the manager with a copy of the corresponding unit of data stored at the agent.

4. A method as set forth in claim 1 wherein step (5) comprises the steps of;

(5.1) replacing the corresponding unit of data stored at the manager with a copy of the corresponding unit of data stored at the agent, if the corresponding first values match and the corresponding second values do not match;

(5.2) deleting the corresponding unit of data stored at the manager, if the manager has a first value and the agent does not have a matching first value; and (5.3) adding at the manager a copy at the manager of the corresponding unit of data from the agent, if the agent has a first value for which the manager does not have a matching first value.

5. A method as set forth in claim 1 wherein said first value is assigned upon the creation of the unit of data and each said second value is set to a predetermined value upon creation of the unit of data.

6. A method as set forth in claim 4 wherein said second value is incremented when the corresponding unit of data is revised.

7. A method as set forth in claim 5 wherein said first value cannot be altered after creation.

8. A method as set forth in claim 1 wherein step (4) comprises;

(4.1) said manager requesting said agent to send to it via said communications network a copy of the first and second values stored at the agent;

(4.2) said agent sending said first and second values stored at said agent to said manager via said communications network responsive to said request;

(4.3) said manager generating a report of its stored first and second values; and (4.4) said manager comparing said first and second values received from said agent to said report of its first and second values.

9. A method as set forth in claim 1 wherein said agent further stores data on each active fault at said agent and said manager further stores a putative copy of said active fault data for said agent, said method further comprising the steps of;

(6) said manager requesting from said agent data on each active fault at said agent;

(7) said agent sending said active fault data responsive to said request; and (8) said manager updating its active fault data in accordance with said active fault data received from said agent.

10. A method of resynchronizing a network manager to a network agent in an object oriented data communication network, said method comprising the steps of:

(1) storing at said agent a plurality of object instances describing said agent;

(2) storing at said manager a putative copy of said plurality of object instances;

(3) storing at said agent, for each of said object instances, a UNIQUEID attribute that is unique for each object instance;

(4) storing at said agent, for each of said object instances, a DATASYNCH attribute that indicates the number of times that the corresponding object instance has been changed;

(5) storing at said manager a putative copy of said UNIQUEID and DATASYNCH attributes for each object instance at said agent;

(6) comparing said UNIQUEID and DATASYNCH attributes stored at said agent with said corresponding UNIQUEID and DATASYNCH attributes, respectively, stored at said manager; and (7) for every object instance for which the corresponding UNIQUEID and DATASYNCH attributes stored at the manager do not match the UNIQUEID and DATASYNCH attributes, respectively, stored at the agent, revising the object instance stored at the manager.

11. A method as set forth in claim 10 wherein step (5) includes revising said UNIQUEID and DATASYNCH attributes stored by said manager to match the corresponding UNIQUEID and DATASYNCH attributes stored by said agent.

12. A method as set forth in claim 10 wherein step (7) comprises the steps of;

(7.1) replacing the corresponding unit of data stored at the manager with a copy of the corresponding unit of data stored at the agent.

13. A method as set forth in claim 10 wherein step (7) comprises the steps of;

(7.1) replacing the corresponding object instance stored at the manager with a copy of the corresponding object instance stored at the agent, if the corresponding UNIQUEID attributes match and the corresponding DATASYNCH attributes do not match;

(7.2) deleting the corresponding object instance stored at the manager, if the manager has a UNIQUEID attribute for which the agent does not have a matching UNIQUEID attribute; and (7.3) adding a copy of the corresponding object instance of the agent to the manager, if the agent has a UNIQUEID attribute for which the manager does not have a matching UNIQUEID attribute.

14. A method as set forth in claim 10 wherein said UNIQUEID attribute is assigned upon the creation of the corresponding object instance and each said DATASYNCH attribute is set to a predetermined value upon creation.

15. A method as set forth in claim 13 wherein said DATASYNCH attribute is incremented every time the corresponding unit of data is revised.

16. A method as set forth in claim 13 wherein said UNIQUEID attribute cannot be altered after creation.

17. A method as set forth in claim 10 wherein step (6) comprises:

(6.1) said manager requesting said agent to send to it via said communications network a copy of the UNIQUEID and DATASYNCH attributes stored at the agent;

(6.2) said agent sending said UNIQUEID and DATASYNCH attributes stored at said agent to said manager via said communications network responsive to said request;

(6.3) said manager generating a report of the UNIQUEID and DATASYNCH attributes stored at the manager; and (6.4) said manager comparing said UNIQUEID and DATASYNCH attributes from said agent to said report of its UNIQUEID and DATASYNCH attributes.

18. A method as set forth in claim 10 wherein said agent further stores data on each active fault at said agent and said manager further stores a putative copy of said active fault data for said agent, said method further comprising the steps of;

(8) said manager requesting from said agent data on each active fault at said agent;

(9) said agent sending said active fault data responsive to said request; and (10) said manager updating its active fault data in accordance with said active fault data received from said agent.

19. An apparatus for resynchronizing a network manager to a network agent in an object oriented data communication network, comprising:
 a first memory in said agent for storing a plurality of object instances describing said agent, each said object instance including a UNIQUEID attribute that is unique for each object instance and a DATASYNCH attribute that indicates the number of times that the corresponding object instance has been changed;
 a second memory in said manager for storing a putative copy of said plurality of object instances, including said UNIQUEID and DATASYNCH attributes; and
 a processing unit at said manager for comparing said UNIQUEID and DATASYNCH attributes stored at said agent with said corresponding UNIQUEID and DATASYNCH attributes stored at said agent, respectively, upon resynchronization and for every object instance for which the corresponding UNIQUEID and DATASYNCH attributes stored at the manager do not match the UNIQUEID and DATASYNCH attributes, respectively, stored at the agent, revising the object instance stored at the manager.

20. A method as set forth in claim 19 wherein said processing unit includes means for revising said UNIQUEID and DATASYNCH attributes stored by said manager to match the corresponding UNIQUEID and DATASYNCH attributes stored by said agent corresponding to an object instance when said object instance is revised.

21. An apparatus as set forth in claim 19 wherein;
 said agent further comprises memory for storing data on each active fault at said agent;
 said manager further comprises memory for storing a putative copy of said active fault data for said agent;
 said processing unit of said manager further comprises means for requesting from said agent data on each active fault at said agent;
 said processing unit of said agent further comprises means for sending said active fault data responsive to said request; and
 said processing unit of said manager further comprises means for updating its active fault data in accordance with said active fault data received from said agent.

22. An apparatus as set forth in claim 19 wherein said processing unit of said manager further comprises;
 means for replacing the corresponding unit of data stored at the manager with a copy of the corresponding unit of data stored at the agent for every object instance for which the corresponding UNIQUEID and DATASYNCH attributes stored at the manager do not match the UNIQUEID and DATASYNCH attributes, respectively, stored at the agent.

23. A method as set forth in claim 19 wherein said processing unit of said manager further comprises;
 means for replacing the corresponding object instance stored at the manager with a copy of the corresponding object instance stored at the agent, if the corresponding UNIQUEID attributes match and the corresponding DATASYNCH attributes do not match;
 means for deleting the corresponding object instance, if the manager has a UNIQUEID attribute for which the agent does not have a matching UNIQUEID attribute; and
 means for adding a copy of the corresponding object instance of the agent, if the agent has a UNIQUEID attribute for which the manager does not have a matching UNIQUEID attribute.

24. An apparatus as set forth in claim 19 wherein said agent further comprises;
 means for assigning a UNIQUEID attribute for an object instance upon the creation of the object instance; and
 means for assigning a DATASYNCH attribute of a predetermined value to each object instance upon creation of said object instance.

25. An apparatus as set forth in claim 24 wherein said agent further comprises;
 means for incrementing said DATASYNCH attribute every time the corresponding object instance is revised; and
 means for informing the manager of the new value of said DATASYNCH attribute.

26. An apparatus as set forth in claim 19 wherein;
 said processing unit of said manager comprises means for requesting said agent to send to it via said communications network a copy of the UNIQUEID and DATASYNCH attributes stored at the agent;
 said agent comprises means for sending said UNIQUEID and DATASYNCH attributes stored at said agent to said manager via said communications network; and
 said manager comprises means for generating a report of the UNIQUEID and DATASYNCH attributes stored at the manager;
 whereby said processing unit can perform said comparison.

* * * * *